(12) United States Patent
Parker

(10) Patent No.: US 10,883,581 B2  
(45) Date of Patent: Jan. 5, 2021

(54) LEAD SCREW NUT

(71) Applicant: PUNK COUPLINGS LIMITED, Bristol (GB)

(72) Inventor: Simon Parker, Bristol (GB)

(73) Assignee: Punk Couplings Limited, Bristol (GB)

( * ) Notice: Subject to any disclaimer, the term of this patent is extended or adjusted under 35 U.S.C. 154(b) by 68 days.

(21) Appl. No.: 16/309,219

(22) PCT Filed: Jun. 9, 2017

(86) PCT No.: PCT/GB2017/051699  
§ 371 (c)(1),  
(2) Date: Dec. 12, 2018

(87) PCT Pub. No.: WO2017/216529  
PCT Pub. Date: Dec. 21, 2017

(65) Prior Publication Data  
US 2019/0316661 A1    Oct. 17, 2019

(30) Foreign Application Priority Data  
Jun. 14, 2016   (GB) .................................. 1610329.3

(51) Int. Cl.  
F16H 25/24   (2006.01)  
F16H 25/20   (2006.01)

(52) U.S. Cl.  
CPC ....... *F16H 25/24* (2013.01); *F16H 2025/204* (2013.01); *F16H 2025/2445* (2013.01)

(58) Field of Classification Search  
CPC ............... F16H 25/24; F16H 2025/204; F16H 2025/2445  
See application file for complete search history.

(56) References Cited

U.S. PATENT DOCUMENTS 5,816,926 A * 10/1998 Lynch ...................... F16D 3/30  
464/114

FOREIGN PATENT DOCUMENTS

| DE | 3815318 A1 * | 11/1989 | ............ B23Q 5/404 |
| DE | 20 2012 003 946 | 5/2012 | |
| EP | 0 552 464 | 7/1993 | |
| EP | 1 026 027 | 8/2000 | |
| JP | 1-116370 | 5/1989 | |
| JP | 2015/008780 | 1/2015 | |
| WO | WO-03076832 A1 * | 9/2003 | ............ F16C 23/084 |

OTHER PUBLICATIONS

International Search Report and Written Opinion of the ISA for PCT/GB2017/051699, dated Aug. 30, 2017, 12 pages.

* cited by examiner

*Primary Examiner* — Bobby Rushing, Jr.  
(74) *Attorney, Agent, or Firm* — Nixon & Vanderhye P.C.

(57) ABSTRACT

A nut for a lead screw comprises two or more concentric annular members which, when aligned, have common axes. One member is contained within another member outside it. A first member has an outer convex spherical periphery and a second member has an inner spherical concave periphery, the peripheries being concentric with the centre, and the inner periphery of the second is engaged with the outer periphery of the first member. The second member is constrained to rotate about the first member on an axis perpendicular to the common axis.

7 Claims, 11 Drawing Sheets

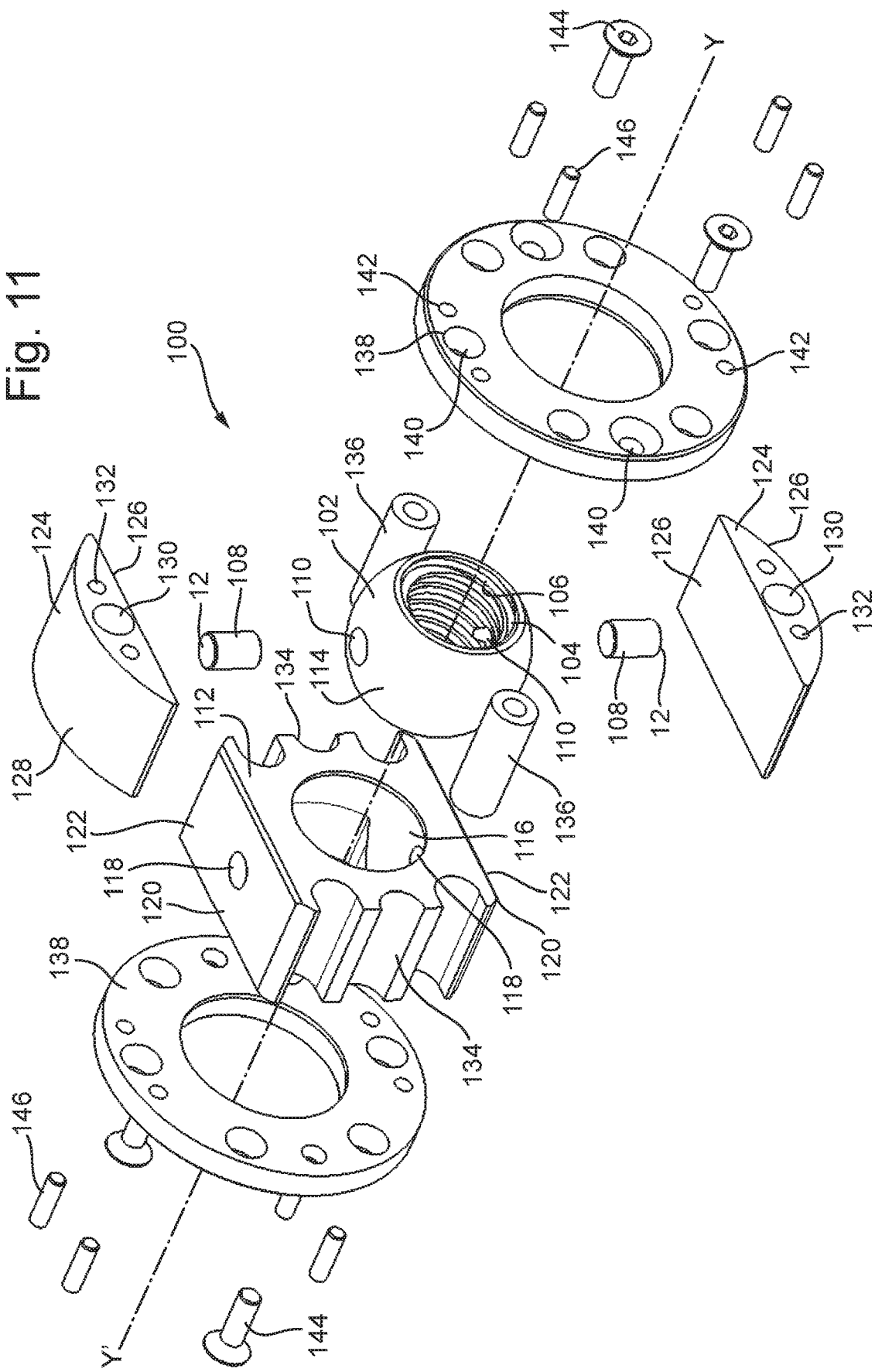

LEAD SCREW NUT

This application is the U.S. national phase of International Application No. PCT/GB2017/051699 filed 9 Jun. 2017, which designated the U.S. and claims priority to GB Patent Application No. 1610329.3 filed 14 Jun. 2016, the entire contents of each of which are hereby incorporated by reference.

This invention relates to a lead screw system.

In various applications, a lead screw nut is mounted between and parallel to a pair of rails, a carriage or the like is mounted on the rails, with the lead screw passing through the table. An internally threaded nut is mounted on the lead screw and within an aperture in the carriage to drive the table to and fro between the parallel rails as the lead screw is rotated. The carriage may me part of a structure or machine.

It is extremely difficult to manufacture such lead screw systems with the rails perfectly parallel. Furthermore in use structural flexing, causes a degree of wear and damage occurs resulting in the components becoming a sloppy fit or jamming. The result is that systems jams with the lead screw locked. The system then has to be dismantled, the lead screw and rails realigned and/or replaced. This in turn leads to down time and cost. Furthermore the precision required in the original manufacture makes such systems expensive to make.

According to the present invention a nut for a lead screw comprising an inner annular member, an intermediate annular member and an outer annular member, the inner, intermediate and outer annular members being concentric and when aligned having common axes, the inner annular member being within the intermediate annular member, and the intermediate annular member being within the outer annular member, in which the inner annular has an outer convex spherical periphery and the intermediate member has an inner spherical concave periphery, the peripheries being concentric with the centre, and the inner periphery of the intermediate member being engaged against the outer periphery of the first member, the intermediate member second member being constrained to rotate about the inner annular member on a first axis perpendicular to the common axis, and in which the intermediate annular member has an outer convex spherical periphery and the outer annular member has an inner spherical concave periphery, the peripheries being concentric with the centre, and the inner periphery of the outer member being engaged against the outer periphery of the intermediate member, the outer annular member being constrained to rotate about the intermediate annular on a second axis perpendicular to both the common axis and the first axis: where the inner annual member has a central bore with an internal screw thread and the outer annular member has at least one pair of parallel external surfaces; the parallel external surfaces supported in sliding contact with co-operating surfaces of a pair of opposed support pieces mounted in a frame.

A lead screw having an external screw thread is fitted within the central aperture of the inner member, the external screw thread of the lead screw co-operating with the internal screw thread of the central aperture to move the nut to and fro in relation to the screw thread.

Ideally in the preferred embodiment, the inner and outer members have parallel sides, which when the nut is aligned the plates are parallel to the said parallel sides, with a space between the plates and the said parallel sides.

In one implementation, the parallel pairs of external surfaces of the outer periphery of the outer member have V-profile opposed edges engaging in a corresponding opposite V profile of the corresponding support pieces.

In one implementation the nut has a pair of plane parallel edges engaging plane flat surfaces of a corresponding pair of support pieces The nut is clamped between plates forming clamping members as described in the examples.

The lead screw passes through wide apertures in the plates, allowing substantial lateral movement of the screw with respect to the plates. In an embodiment with two annular members the screw has two degrees of movement with respect to the plates, in the nut with an intermediate member the screw is free to move in three degrees with respect to the plates, in both cases in additions to being able to move inwards and outwards perpendicularly with respect to the plates the plates.

Arrangements to constrain one member to rotate about another can be:

a pair of diametrically opposed axles mounted in one member and passing into the second; or pairs of diametrically opposed projections extending on a plane from the outer peripheral surface of one member into slots in the inner peripheral surface of a second member; or projections and slots linking the first and intermediate members and axles between the intermediate member and outer members.

The construction and operation of axles and projections is explained more fully in WO2015/087081 and WO2015/08780 respectively In order that the invention might be more fully understood examples are illustrated with respect to the accompanying drawings, in which:

FIG. 11 is an exploded view of the third example of the invention.

Figure 1:
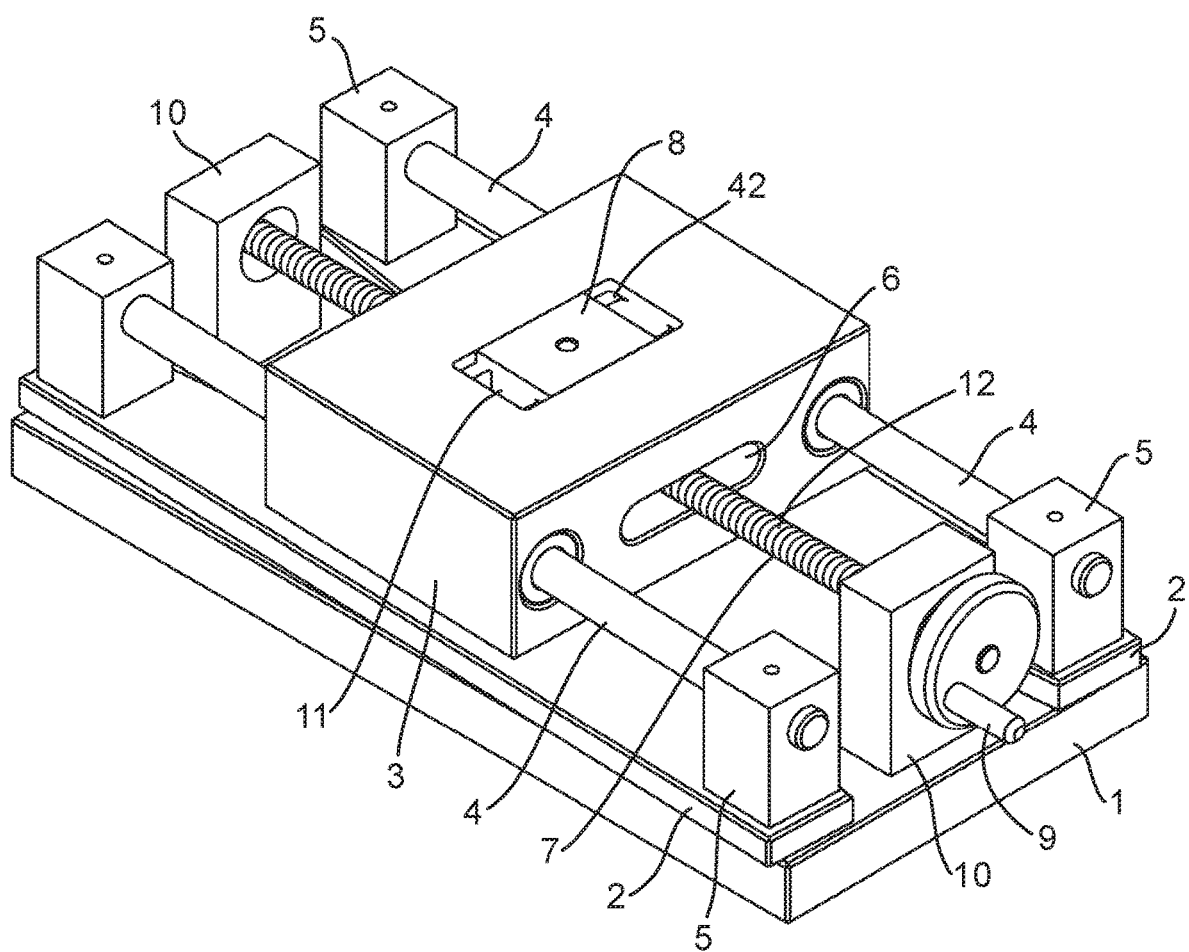
FIG. 1 illustrates a first example of a lead screw nut according to the invention system mounted on a demonstration bench with rails.

In FIG. 1, a pair of rails 4 are mounted each on a pair of mounts 5, mounted on a swiveling plate 2 which swivels at its mid-point on a fixed base plate 1 are supported at their midpoints on a fixed base plate 1. A carriage 3 is mounted on the pairs of rails 4 to slide with respect to the rails. Passing through a slot 6 in the carriage 3 is a lead screw 7, with a lead screw nut 8 according to the invention on the lead screw 7. The lead screw 7 is turned by a handle 9 and is mounted on the table 1 between a pair of mountings 10. The lead screw nut 8 is mounted within an aperture 11 in the carriage 3. Tuning of the handle 9 rotates the lead screw 7 and the external thread 12 on the lead screw moves the lead screw nut 8 to and fro with respect to lead screw 7, driving the table to and fro between rails 4. Any misalignment of the lead screw and/or the rails is compensated for by the lead screw nut 8 as described below. In FIG. 1 the end plates 42 of lead screw nut 8 can be seen, these are discussed below with reference to FIGS. 2 to 13.

In FIGS. 2 to 7 a lead screw nut 8 comprises an inner annular member 14, an intermediate annular member 18 and an outer annular member 26 having, when aligned, a common axes X1-X1' and a common centre C on the axis.

The inner member 14 has a central aperture 15 with an internal thread 16. The outer periphery 17 of the inner member is convex, being a spherical segment with its centre at the common centre. C.

The annular intermediate member 18 has an inner spherical concave inner periphery, 19 which is a spherical segment with its centre at the common centre C. The peripheries 17 and 19 are wholly engaged against one another.

The intermediate member 18 has an outer convex spherical periphery 25. The outer member 26 has an inner spherical concave periphery 27, the peripheries 25 and 27 are spherical segments concentric with the common centre, and the outer periphery 25 of the intermediate member 18 is wholly engaged with the inner periphery 27 of the outer member 26.

The intermediate member 18 has a pair of diametrically opposed axles 21 mounted in axle holes 23 and passing into axle holes 22 in the inner member 14. The axles 21 are on an axis X2-X2' perpendicular to axis X1-X1' and constrain the intermediate member 18 to rotate with respect to the inner member 14 about axis X2-X2'. Axis X2-X2' passes through the common centre C.

The outer member 26 has a pair of diametrically opposed axles 28 mounted in axle holes 30 and passing into axle holes 29 in the intermediate member 18. The axles 28 are on an axis X3-X3' and perpendicular to both axis X1-X1' and axis X1-X1' and passes through the common centre C. The axles 28 constrain the outer member 26 to rotate with respect to the intermediate member 18 about axis X3-X3'.

Lead screw 7 having an external screw thread 12 is fitted within the central aperture 15 of the inner member 14, with its thread 12 engaging with the internal thread 16 of inner member 14.

The outer profile of outer member 26 is square in shape having one pair of parallel edges 33 and the other pair of parallel edges 37. Opposed top and bottom edges 33 have an inverted V profile. Mounted outside edges 33 are opposed top and bottom support pieces 34, whose face opposite edges 33 have matching V-profiles 35 into which the inverted V edges 33 fit.

Figure 5:
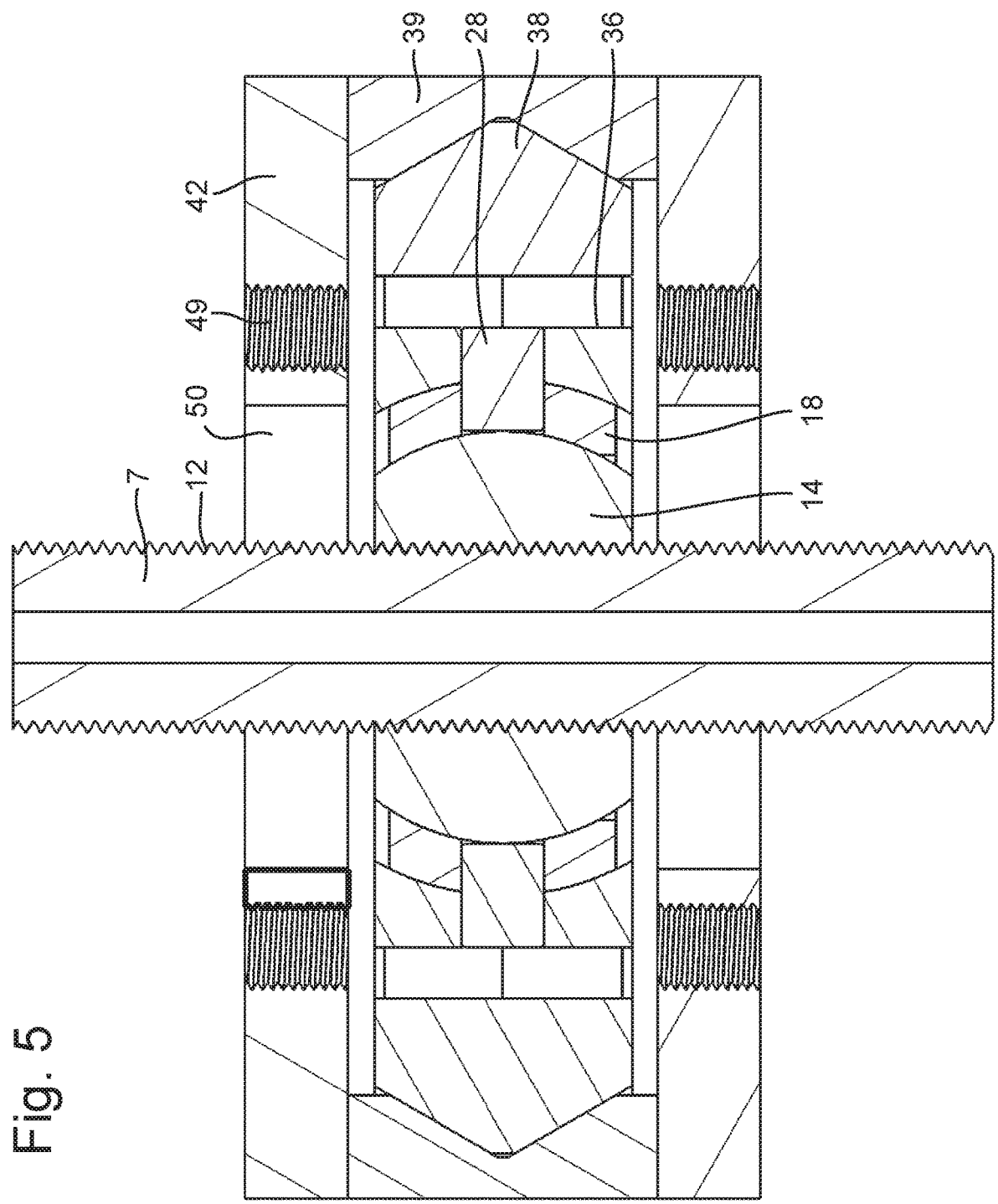
FIG. 5 is vertical section of the nut when aligned.
Figure 6:
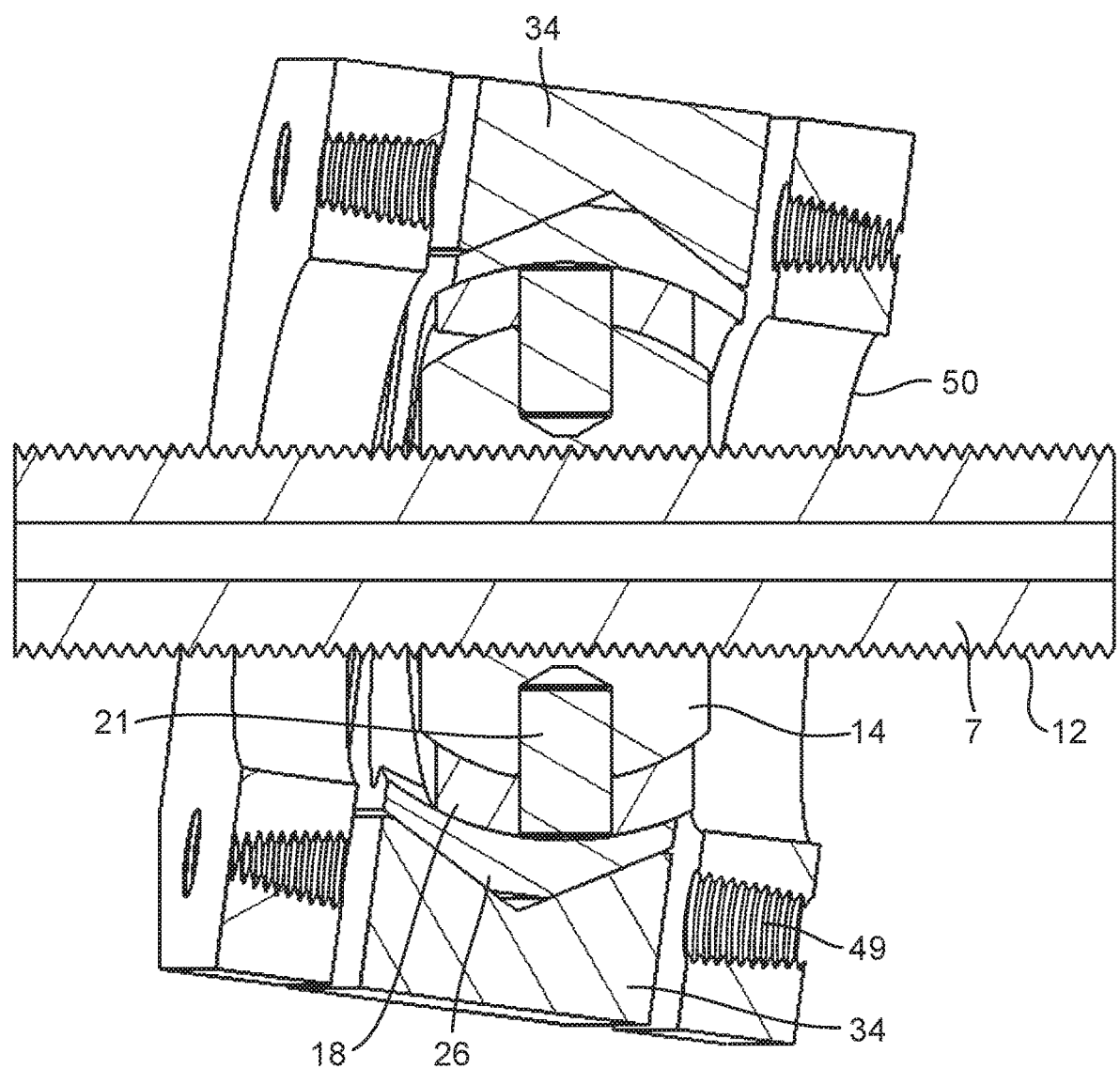
FIG. 6 is a horizontal section of the nut when misaligned.

Towards each end of the top and bottom pieces 34 are cut out sections 36 into which the tops and bottoms of side pieces 38 fit. The faces 37A of side pieces 38 facing the edges 37 of outer member 26 are plain as are side faces 37. This enables the side pieces 38 to move vertically with the top and bottom pieces 34. The outside faces 40 of side pieces 38 are of an inverted V-section to co-operate with V-sectioned internal faces 41 of side clamps 39. It can be seen that with this arrangement the outer member 26 can move both vertical and sidewise with respect to the top and bottom pieces 34 and the side clamps 39. To facilitate vertical movement the side clamps 41 are less deep that the side pieces 38 allowing a space 47 between the tops of the side clamps 39 and cut outs 36 in the top and bottom pieces 34 members (the space 47 is best seen in FIG. 5).

Spaced apart from the members 14, 18 and 26 are end plates 42 having inward facing sides 45 parallel (in the aligned condition) to the sides 43 and 44 of inner and outer members 14 and 26 with a space 46 (best seen in FIG. 3) between the sides 43, 44 and the inward facing sides 45. The sides 43 and 44 are in the same planes P1 and P2. The sides 48 of intermediate member 18 are inside the notional parallel planes P1 and P2 formed through sides 43 and 44 (see FIG. 3), allowing the intermediate member 18 freedom to rotate about inner member 14.

End plates 42 have tapped bolt holes 49 for mating the nut 8 to a moving structure or machine element, such as the carriage of FIG. 1. The width of the end plates 42 is greater than the separation of the end clamps 39 enabling the assembled lead screw support 8 to be fitted into slot 11 in a carriage 3 as in FIG. 1. The lead screw 7 would be fitted to the aperture 15 on inner member 14 after the unit had been slotted into the aperture 11.

The end plates 42 each have a large aperture 50 through which the lead crew 7 passes allowing for significant clearance of the screw 12 in all dimensions with respect to the endplates 42, allowing the nut to compensate for misalignments of the screw 12 with a moving structure or machine (such as the carriage 3 of FIG. 1), in two dimensions, both horizontally and vertically.

To assist assembly of the nut 8. Intermediate member has 18 has two diametrically opposite loading slots 31, the slots extend halfway across the width of the intermediate member. The slots are dimensioned so that the diametrically opposite floors of the slots 31 are spaced by the diameter of the outer surface 17 of the inner member 14. The width of each slot 31 is equal to or slightly greater than the width of the inner member. The inner member 14 is introduced sideways into the slots and then rotated into place. The axles 21 are then inserted. A similar process is used to insert intermediate member 18 to outer member 26, with loading slots 32, with axles 28 being then fitted in place.

Figure 7:
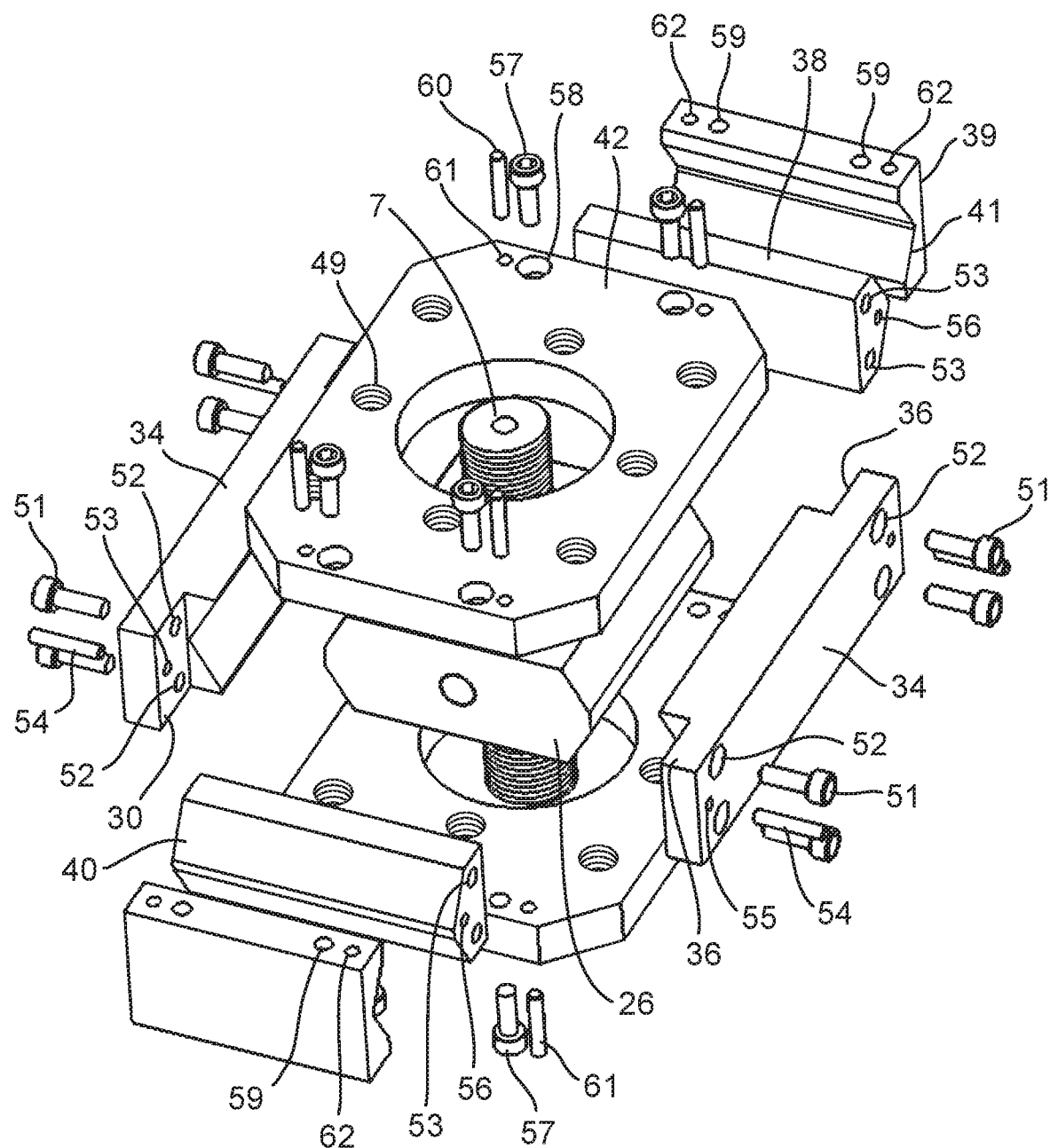
FIG. 7 is a perspective view of the nut illustrating final assembly.

In FIGS. 2 to 6, for clarity, arrangements for bolting the nut together have been omitted. These are shown in FIG. 7. The main parts visible are as described in FIGS. 1 to 6 and are not reintroduced here.

In FIG. 7, the top and bottom pieces 34 have bolt holes 52 passing through to the stepped portion 36, in which side pieces 38 are fitted, the ends of the side pieces 38 have threaded holes 53. In addition the top and bottom pieces 34 have location holes 55 with corresponding location holes 56 in the ends of side pieces 38. Location pins 54 are first inserted into location holes 55 and 56, with bolts 51 then passed through the bolt holes 52 into threaded hoes 53, and tightened.

The end plates 42 have bolt holes 58 passing through. Side clamps 39 have threaded holes 59. In addition the end plates 42 have location holes 61 with corresponding location holes 62 in the side clamps 39. Location pins 60 are first inserted into location holes 61 and 62, with bolts 57 then passed through the bolt holes 58 into threaded holes 59, and tightened. This will hold the side clamps 39 fixed with respect to the end plates 42, but allowing the side pieces 38 to move to and fro with respect to the side clamps 39 in alignment with the apex of the V-sectioned internal faces 41 of the side clamps 39. This compensates for relative movement of the screw 7 in an axis parallel to the apex of the V-sectioned profile 41. Likewise the V-sectioned profile of external faces 33 of the outer member 26, engaging with the V-profiles 35 of top and bottom pieces 34, allows for movement of the screw 7 on an axis perpendicular to the apex the V-sectioned profile 41. The arrangement of the annular members 14, 18 and 26 as described allows for angular misalignment the screw 7 relative to the structure or machine being driven by screw 7.

The lead screw nut of this invention will allow a lead screw to continue to operate despite considerable out of alignment of the mounting rails or the lead screw of a table both vertically and horizontally.

Figure 2:
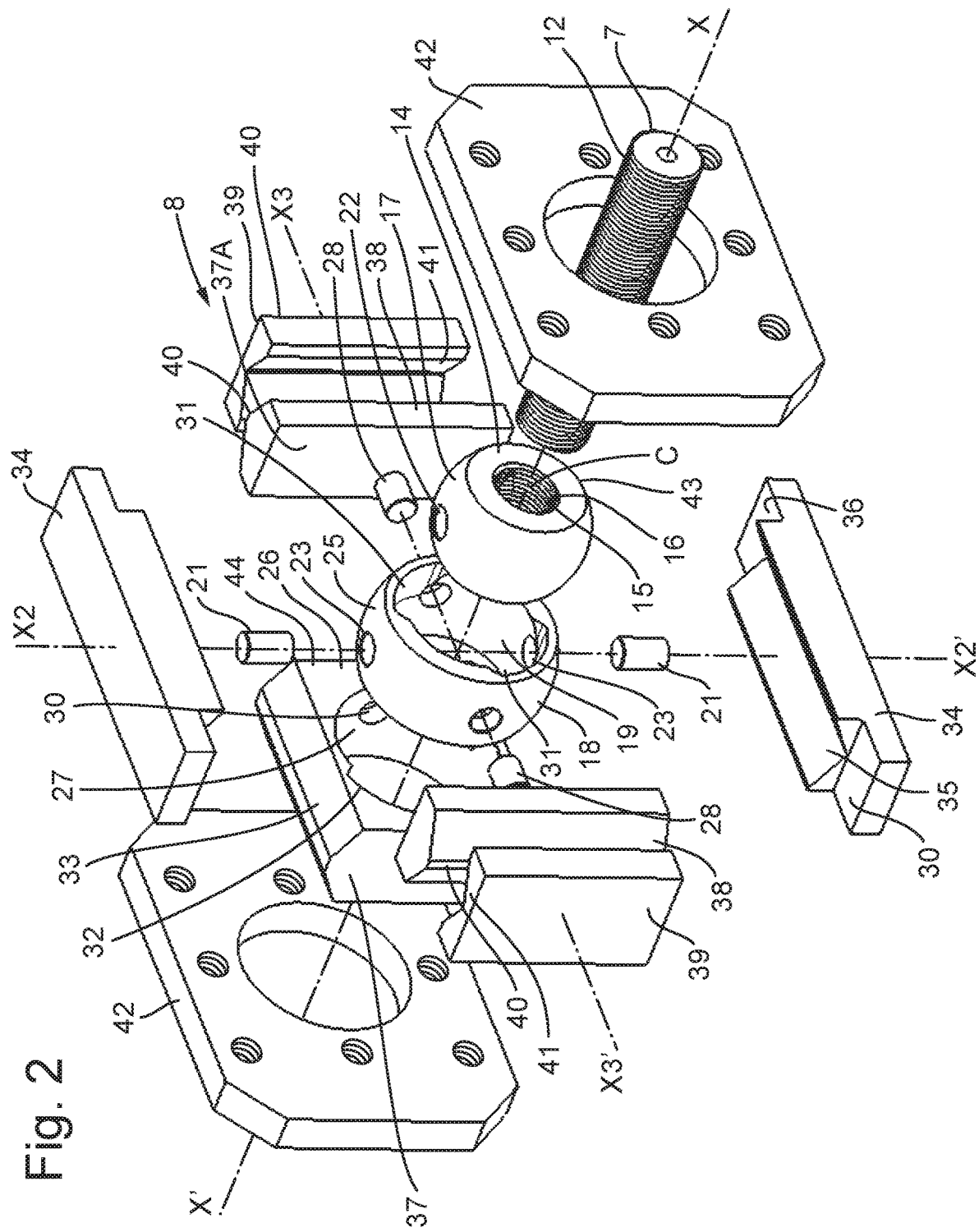
FIG. 2 is an exploded view of the first example lead screw nut according to the invention.
Figure 3:
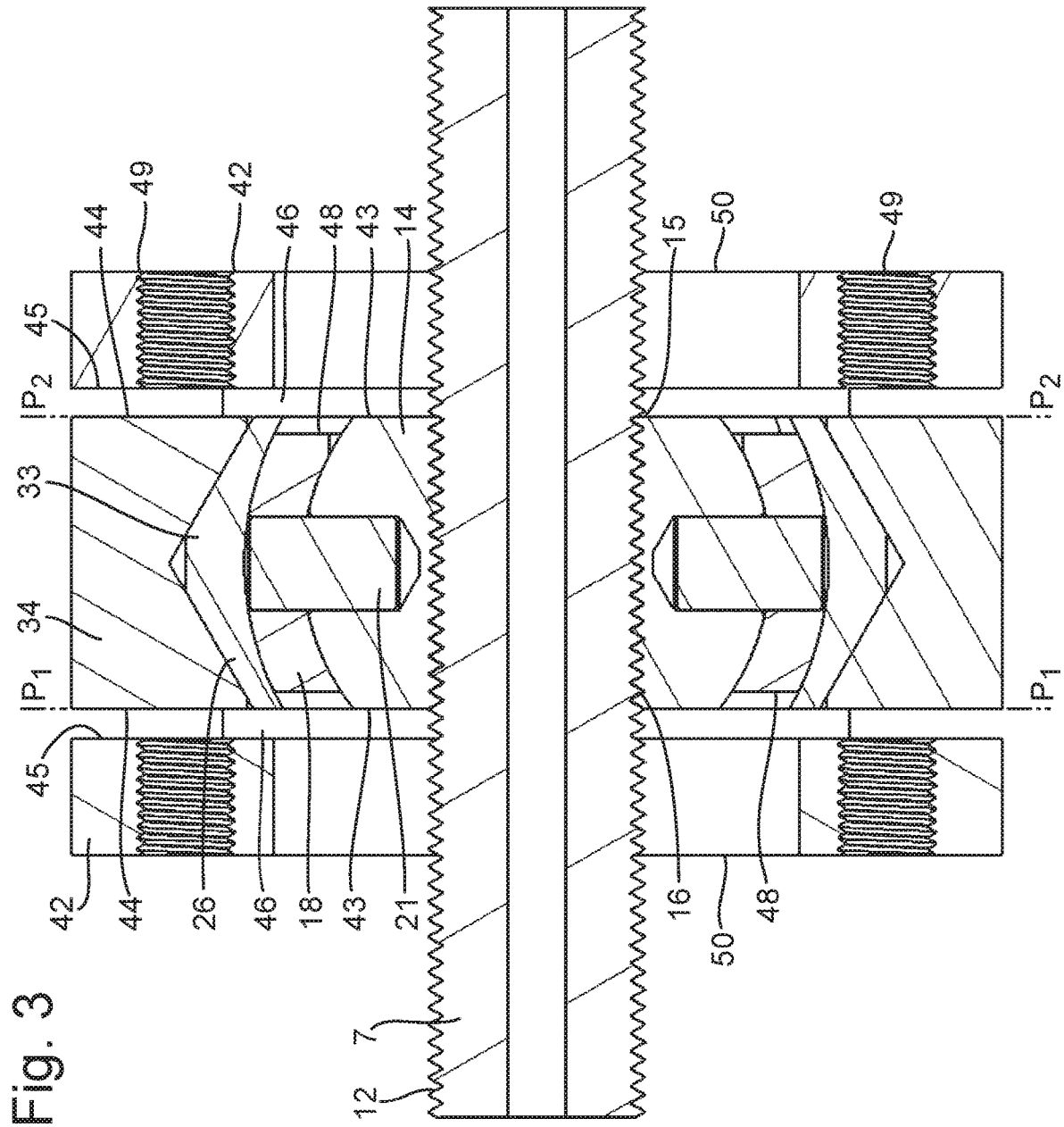
FIG. 3 is a section through the nut of FIG. 2 when aligned.
Figure 4:
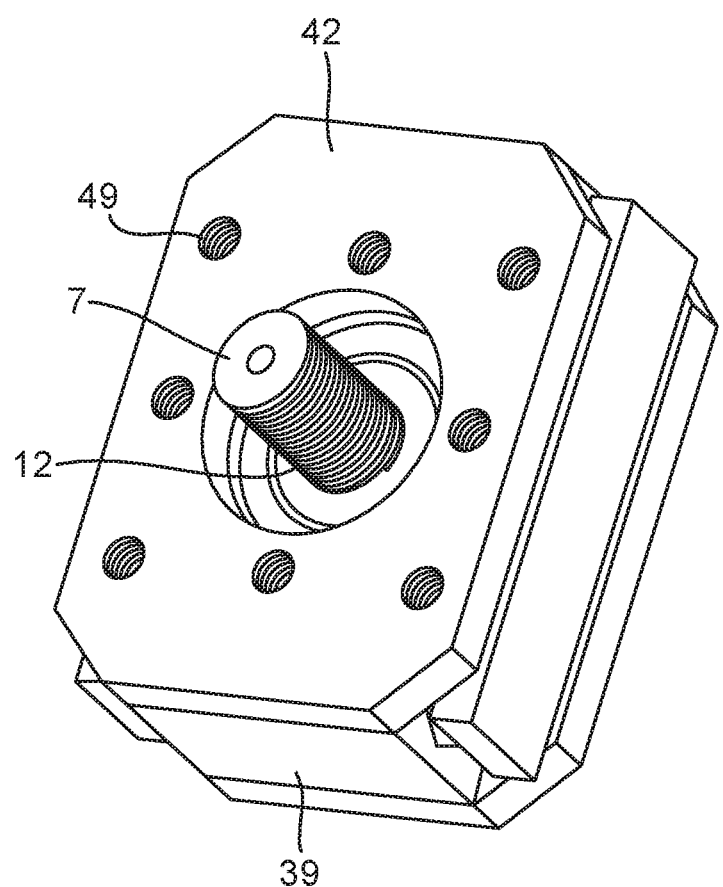
FIG. 4 is an isometric view of the nut when aligned.

In this FIGS. 1 to 7 "top", "bottom", "side", "vertical", "horizontal" refer to the orientation of parts as show in FIG. 2, these expressions are not to be read as limiting the position of those parts when in use as the nut 8 can be fitted to a screw 7 in the appropriate orientation.

Figure 8:
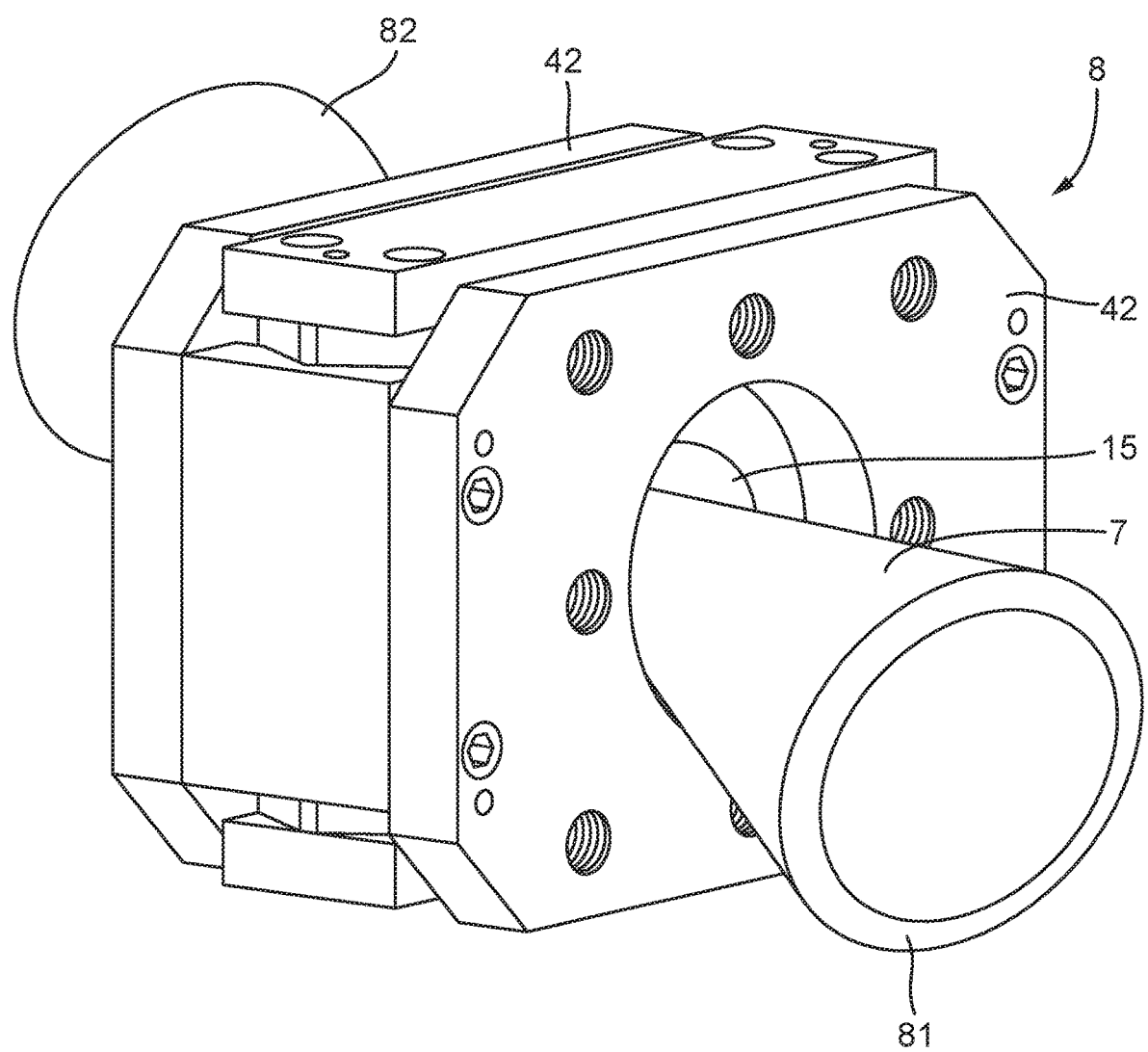
FIG. 8 shows degree of freedom of movement of the nut described in FIGS. 1 to 7.

In FIG. 8, nut 8 is shown as described in FIGS. 2 to 7 with screw 7 passing though the plates 42 into the internal threaded inner periphery of inner member 15. In addition to movement into and out of the inner member 15 brought about by turning the screw 7, the screw 7 is free to move within the cylindrical cone outlines shown by 80 and 82, allowing for considerable compensation within the nut 8 of movement of the screw out of alignment with the nut 8.

Figure 9:
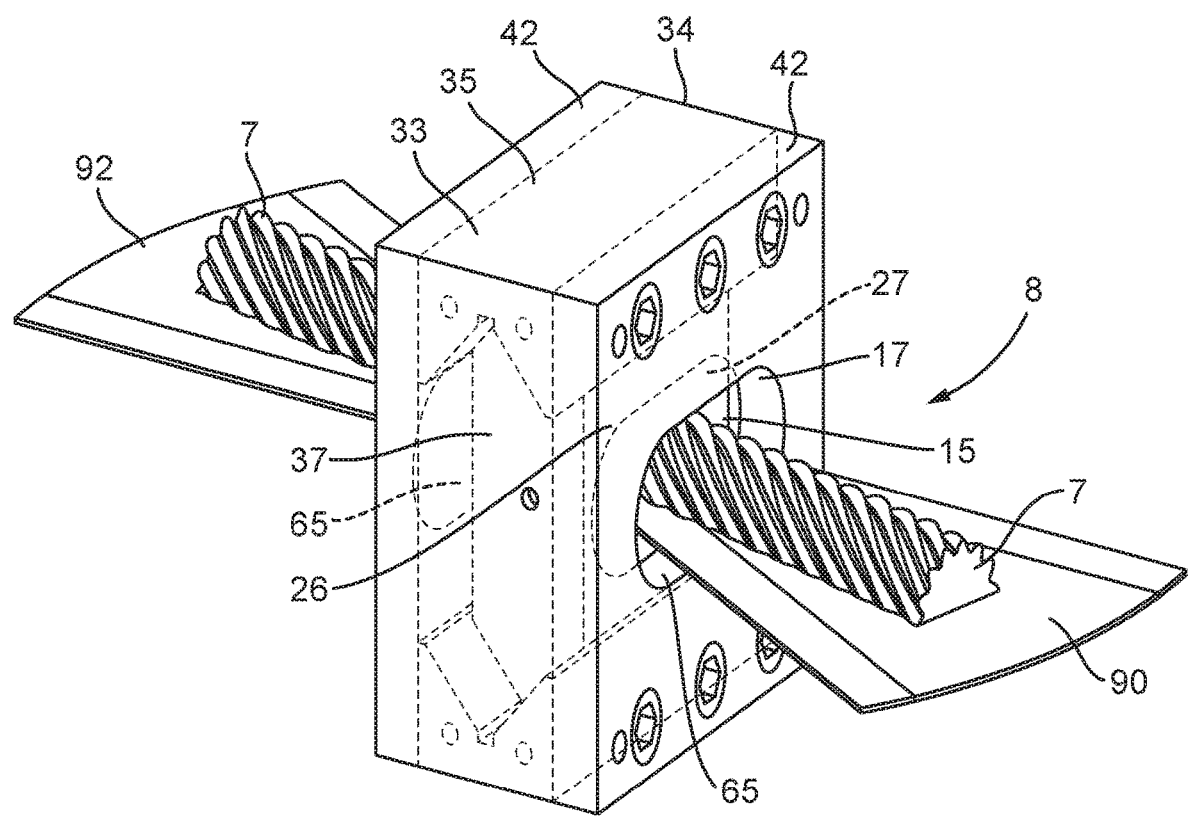
FIG. 9 shows an isometric view of a second example of the invention, similar in outward appearance to the first example, but having one fewer degrees of freedom of movement.

Although the invention has been described to allow compensation in two dimensions, it can be designed to compensate in one dimension only. An example is shown in FIG. 9. Here the intermediate member 19 had been omitted and the nut comprises with the convex outer periphery 17 of inner member 15 engaging against the concave inner periphery 27 of outer member 26.

The outer profile of outer member 26 is square in shape having one pair of parallel edges 33 and the other pair of parallel edges 37. Opposed top and bottom edges 33 have an inverted V profile. Mounted outside edges 33 are opposed top and bottom support pieces 34, whose face opposite edges 33 have matching V-profiles 35 into which the inverted V edges 33 fit. The sides 37 are not supported. The outer member 26 can rotate about the inner member on an axis perpendicular to the central axis of inner member 15, but not in any other dimension. To facilitate this, edges 33 can slide in V-profiles 35 of support pieces 34. End plates 42 are fitted front and back of the nut as before with the screw 7 pass via slots 65 though the end plates 42 into the internally screw threaded inner member 15.

In the embodiment of FIG. 9, the screw 7 is free to move within the one dimensional volume out lines shown by 90 and 92, allowing for compensation within the nut 8 of movement of the screw in one dimension out of alignment with the nut 8.

Figure 10:
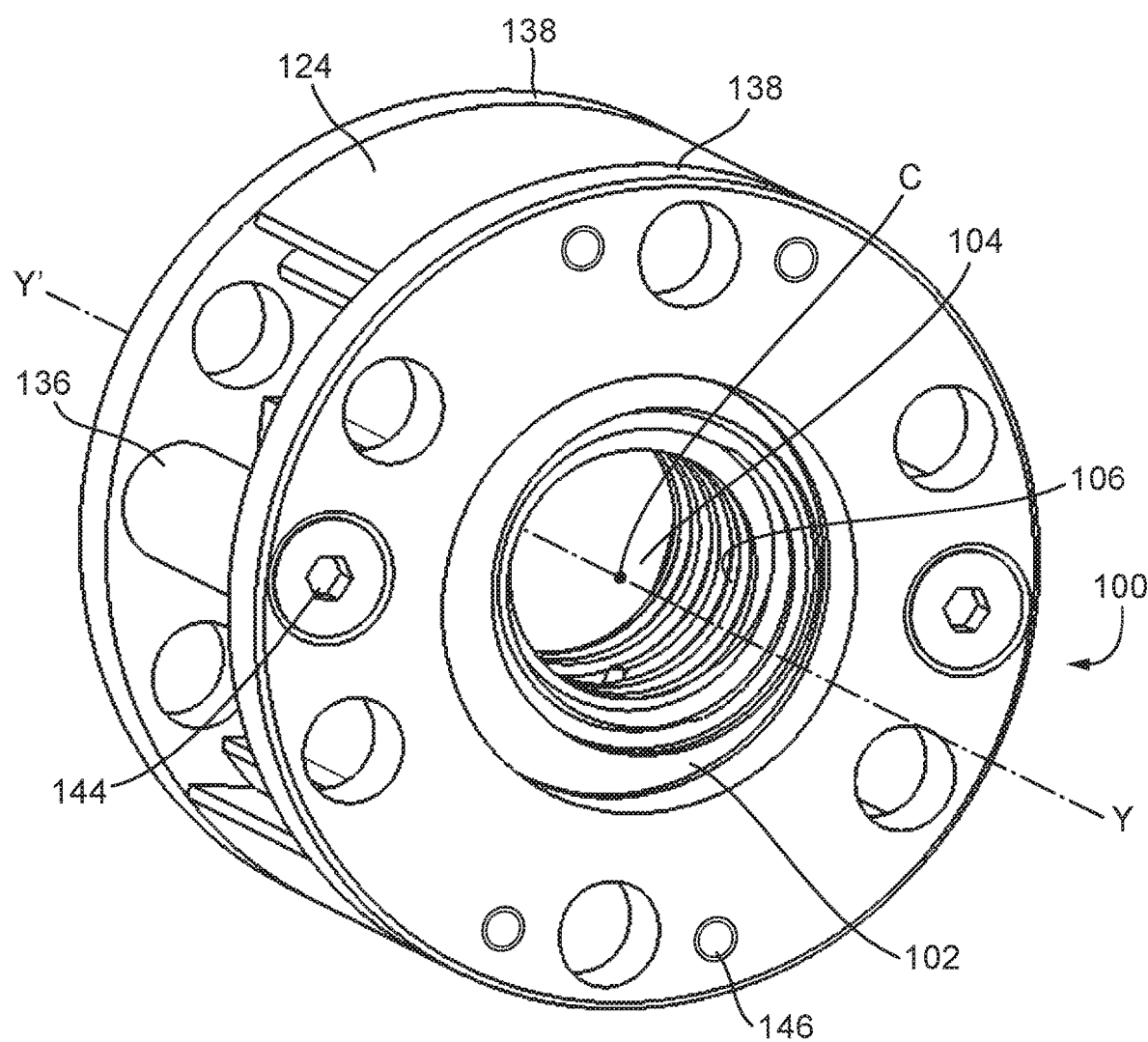
FIG. 10 is an isometric view of third example of the invention.

Although lighter and cheaper to manufacture than the example of FIGS. 1 to 8, the volume and weight of the second example of the invention shown in FIG. 9, and thus cost, is reduced further in the third example of the invention shown in FIGS. 10 and 11.

In FIGS. 10 and 11 the screw indicated as item 7 in other figures is omitted for clarity.

The nut 100 comprises an inner annular member 102 with a central bore 104, with a screw tread 106 to receive the screw. The annular member 102 has a central axis Y-Y'; with the centre C of the annulus C is on the axis Y-Y'.

The inner member 102 has a convex outer periphery 114 which engages against the concave inner periphery 116 of outer member 112.

Opposed axles 108 with axes on the line Z-Z', which is perpendicular to the central axis X-X', are mounted in holes 118 top and bottom of the outer member and pass into holes 110 in inner member 102. Thus outer member 112 can rotate about inner member on an axis defined by Z-Z'. Axis Z-Z' passes through the centre C of the inner member 102. The top and bottoms 120 of the outer member 112 have flat surfaces 122 defining parallel planes. Support pieces 124, shaped as segments of the edge of a right cylinder, have flat inner surfaces 126 and cylindrical outer surfaces 128. Bolt holes 130 and pin holes 132 pass through the support pieces from one side to the other. The side faces 134 of the outer member 112 between the top and bottom surfaces have cut outs to receive bolt carriers 136. The circular end plates 138 have bolt and pin holes towards their periphery and a large central aperture through which the screw would pass to engage the treads 106 around aperture 104 of inner member 102. It should be noted that the curvature of outer cylindrical surfaces 128 of support pieces, matches the perimeter of the end plates 138. The end plates have holes for bolts and pins 140 and 142. Bolts and pins 144 and 146 engage the bolt carriers 136 and the support pieces 124 to bolt the nut 100 together.

As demonstrated in FIG. 9, a nut such as in FIGS. 10 and 11 having only an inner member and an outer member allows relative freedom of movement in one dimension to a screw being screwed one way or the other through the inner member 102. The nuts of FIGS. 9 and 10 are more compact and hence lighter than examples of FIGS. 1 to 9.

In this description 1 to 7 "top", "bottom", "side", "vertical", "horizontal" refer to the orientation of parts as shown in the relevant FIG. 2, these expressions are not to be read as limiting the position of those parts when in use as the nut 8 can be fitted to a screw 7 in any appropriate orientation.

The invention claimed is:

1. A nut for a lead screw comprising an inner annular member, an intermediate annular member and an outer annular member, the inner, intermediate and outer annular members being concentric and when aligned having common axes, the inner annular member being within the intermediate annular member, and the intermediate annular member being within the outer annular member, in which the inner annular member an outer convex spherical periphery and the intermediate member has an inner spherical concave periphery, the peripheries being concentric with the center, and the inner periphery of the intermediate member being engaged against the outer periphery of the inner annular member, the intermediate member being constrained to rotate about the inner annular member on a first axis perpendicular to the common axis, and in which the intermediate annular member has an outer convex spherical periphery and the outer annular member has an inner spherical concave periphery, the peripheries being concentric with the centre, and the inner periphery of the outer member being engaged against the outer periphery of the intermediate member, the outer annular member being constrained to rotate about the intermediate annular on a second axis perpendicular to both the common axis and the first axis: where the inner annual member has a central bore with an internal screw thread and the outer annular member has at least one pair of parallel external surfaces; the parallel external surfaces supported in sliding contact with co-operating surfaces of a pair of opposed support pieces mounted in a frame.

2. A nut according to claim 1 having an external lead screw thread is fitted within the central bore of the inner member, the external screw thread of the lead screw co-operating with the internal screw thread of the central aperture to move the nut axially in relation to the screw thread.

3. A nut according to claim 1 in which the outer member has a square or rectangular periphery with two pairs of opposed surfaces supported in sliding contact with corresponding surfaces of two pairs of opposed support pieces mounted in a frame.

4. A nut according to claim 1 in which a parallel pairs of external surfaces of the outer periphery of the outer annular member have V-profile opposed edges engaging in a corresponding opposite V profile of the corresponding support pieces.

5. A nut according to claim 1 in which the outer member has a pair of planar parallel edges engaging plane flat surfaces of a corresponding pair of support pieces.

6. A nut according to claim 1 in which the inner and outer annular members have parallel sides, with the outer member disposed between plates that are parallel to the parallel sides of the members when the members are aligned, with a space between the plates and the said parallel sides.

7. A nut according to claim 6 and in which the plates are circular discs and in which the outer member has a pair of plane parallel edges engaging plane flat surfaces of a corresponding pair of support pieces, and in which the curvature of the external surfaces of the support pieces match the periphery of the plates.

\* \* \* \* \*